US012568951B2

(12) United States Patent
Bouten et al.

(10) Patent No.: US 12,568,951 B2
(45) Date of Patent: Mar. 10, 2026

(54) METHOD FOR OPERATING AN AGRICULTURAL MACHINE HAVING WORKING TOOLS CONFIGURED FOR MECHANICAL WEEDING AND AGRICULTURAL MACHINE

(71) Applicant: KUBOTA CORPORATION, Osaka (JP)

(72) Inventors: Max Bouten, Osaka (JP); Leandro O. Santos, Osaka (JP); Masahiro Kawabata, Osaka (JP); Peter Van Der Vlugt, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 487 days.

(21) Appl. No.: 18/042,073

(22) PCT Filed: Sep. 8, 2021

(86) PCT No.: PCT/EP2021/074663
§ 371 (c)(1),
(2) Date: Feb. 17, 2023

(87) PCT Pub. No.: WO2022/058208
PCT Pub. Date: Mar. 24, 2022

(65) Prior Publication Data
US 2023/0309545 A1 Oct. 5, 2023

(30) Foreign Application Priority Data

Sep. 15, 2020 (EP) ...................................... 20196315

(51) Int. Cl.
*A01M 21/02* (2006.01)
*A01B 63/00* (2006.01)

(52) U.S. Cl.
CPC ........... *A01M 21/02* (2013.01); *A01B 63/008* (2013.01)

(58) Field of Classification Search
CPC ............................. A01M 21/02; A01B 63/008
See application file for complete search history.

(56) References Cited

U.S. PATENT DOCUMENTS 1,422,090 A * 7/1922 Dickie ..................... A01B 1/20
403/230
5,442,552 A * 8/1995 Slaughter ............... G06V 10/25
701/28

(Continued)

FOREIGN PATENT DOCUMENTS

CA       2193837 C  *  7/2007  .......... A01M 7/0089
CN   107343494 A     11/2017

(Continued)

OTHER PUBLICATIONS

International Search Report for corresponding PCT Application No. PCT/EP2021/074663 dated Jan. 4, 2022, 13 pages.

*Primary Examiner* — Claude J Brown
(74) *Attorney, Agent, or Firm* — Leason Ellis LLP

(57) ABSTRACT

A method for operating an agricultural machine having working tools configured for mechanical weeding including receiving in a control unit first weed condition data indicative of a first weed condition of weed to be mechanically weeded by the working tools; providing first control signals in response to receiving the first weed condition data, the first control signals assigned to the first weed condition according to operation control data stored in a memory device; operating the working tools according to the first control signals; receiving second weed condition data indicative of a second weed condition of the weed to be mechanically weeded; providing second control signals in the control unit in response to receiving the second weed (Continued)

Figure 1:

condition data, the second control signals assigned to the second weed condition according to the operation control data; and operating the working tools according to the second control signals for mechanical weeding.

13 Claims, 2 Drawing Sheets

(56)                         References Cited

U.S. PATENT DOCUMENTS

| | | | | |
|---|---|---|---|---|
| 5,632,344 | A * | 5/1997 | Fix ........................ | A01B 33/146 |
| | | | | 172/111 |
| 2011/0211733 | A1 * | 9/2011 | Schwarz .............. | A01B 79/005 |
| | | | | 382/110 |
| 2013/0110341 | A1 * | 5/2013 | Jones ................... | G05D 1/0234 |
| | | | | 701/23 |

| | | | | |
|---|---|---|---|---|
| 2014/0259898 | A1 * | 9/2014 | Jens ...................... | A01M 21/02 |
| | | | | 47/1.43 |
| 2014/0260148 | A1 * | 9/2014 | Jens ........................ | A01D 34/52 |
| | | | | 56/10.2 R |
| 2015/0237790 | A1 | 8/2015 | Redden et al. | |
| 2016/0157411 | A1 * | 6/2016 | Lysaght ................. | A01B 39/18 |
| | | | | 172/1 |
| 2016/0361949 | A1 * | 12/2016 | Cavender-Bares .... | A01B 39/12 |
| 2017/0071188 | A1 * | 3/2017 | Rees ................... | A01M 7/0089 |
| 2017/0251589 | A1 * | 9/2017 | Tippery ................... | A01B 3/50 |
| 2020/0036836 | A1 | 1/2020 | Schwengler et al. | |

FOREIGN PATENT DOCUMENTS

| | | | |
|---|---|---|---|
| CN | 110622949 | A1 | 12/2019 |
| EP | 2910098 | A1 | 8/2015 |
| EP | 3406124 | A1 | 11/2018 |
| WO | 2019100118 | A1 | 5/2019 |
| WO | 2019158454 | A1 | 8/2019 |

* cited by examiner

METHOD FOR OPERATING AN AGRICULTURAL MACHINE HAVING WORKING TOOLS CONFIGURED FOR MECHANICAL WEEDING AND AGRICULTURAL MACHINE

CROSS-REFERENCE TO RELATED APPLICATIONS

This application is a U.S. National Stage Application under 35 U.S.C. § 371 of International Patent Application No. PCT/EP2021/074663, filed Sep. 8, 2021, which claims priority to EP Patent Application No. 20196315.4, filed Sep. 15, 2020, the contents of which are each hereby incorporated by reference in their respective entireties.

A method for operating an agricultural machine having working tools configured for me- chanical weeding and agricultural machine The present disclosure refers to a method for operating an agricultural machine having working tools configured for mechanical weeding and an agricultural machine.

BACKGROUND

As an alternative to applying chemicals for weed management and control, mechanical weeding has been applied. Mechanical weed control, for example, may involve weeding the whole crop, or it may be limited to selective weeding, such as inter-row weeding. A mechanical weeder may be provided with working tools selective from the following: hoes, harrows, tines and brush weeders, and cutting tools.

With respect to mechanical weeding, a key is to apply working tools adequately and efficiently.

SUMMARY

It is an object of the present disclosure to provide a method for operating an agricultural machine having working tools configured for mechanical weeding and an agricultural machine which allow for improved mechanical weeding.

For solving the problem, a method for operating an agricultural machine having working tools configured for mechanical weeding is provided. Further an agricultural machine is provided. Further aspects are disclosed in dependent claims.

According to an aspect, a method for operating an agricultural machine having working tools configured for mechanical weeding is provided. While the agricultural machine is travelling on a field, the method comprises: receiving first weed condition data indicative of a first weed condition of weed to be mechanically weeded by the working tools in a control unit of the agricultural machine; providing first control signals in the control unit in response to receiving the first weed condition data, the first control signals assigned to the first weed condition according to operation control data stored in a memory device; operating the working tools according to the first control signals for mechanical weeding; receiving second weed condition data indicative of a second weed condition of the weed to be mechanically weeded, wherein the second weed condition is different from the first weed condition; providing second control signals in the control unit in response to receiving the second weed condition data, the second control signals assigned to the second weed condition according to the operation control data; and operating the working tools according to the second control signals for mechanical weeding.

According to another aspect, an agricultural machine is provided, the agricultural machine comprising working tools configured for mechanical weeding while the agricultural machine is travelling on a field, and a control unit. The control unit is configured to: receive first weed condition data indicative of a first weed condition of weed to be mechanically weeded by the working tools in a provide first control signals in the control unit in re-control unit of the agricultural machine; sponse to receiving the first weed condition data, the first control signals assigned to the first weed condition according to operation control data stored in a memory device; apply the first control signals for operating the working tools according to the first control signals for mechanical weeding; receive second weed condition data indicative of a second weed condition of the weed to be mechanically weeded, wherein the second weed condition is different from the first weed condition; provide second control signals in the control unit in response to receiving the second weed condition data, the second control signals assigned to the second weed condition according to the operation control data; and apply the second control signals for operating the working tools according to the second control signals for mechanical weeding.

The method and the agricultural machine proposed provide for improved mechanical weeding. Working tools provided for mechanical weeding on the agricultural machine are operated in dependence on different weed conditions of the weed to be mechanically weeded by the working tools while the agricultural machine is travelling on the field. Thus, the working tools are applied more efficiently for mechanical weeding. Different conditions or parameters present for the weed for which mechanical weeding is to be applied are taken into account for operating the working tools of the agricultural machine.

Different weed conditions are assigned different control signals which are to be applied for operating the working tools for mechanical weeding. The different weed conditions may be provided as a plurality of weed classes (classification). The plurality of weed classes is each assigned a plurality of control signals, wherein different weed classes are assigned different control signals. Such classification may be conducted in dependence on weed conditions indicative of one or more conditions or parameters relevant for the weed for which mechanical weeding is to be applied. Weed condition, for example, may be a parameter or a condition of the weed itself, the parameter, for example, referring to size and/or species of weed. Such weed condition may be referred to as direct weed condition. Alternatively or in addition, some weed condition may refer to some parameter or condition of the soil, such soil condition having impact on the weed (growing). Such weed condition may be referred to as indirect weed condition. For example, soil condition may refer to the aspect of wet or dry soil which may have an impact on weed condition (growing condition), Alternatively, color of the soil may provide an indication for type of soil which in turn may give indication about weed condition. Also, some parameter or condition of crop plants may be indicative of some weed condition having impact on the weed (growing). Similarly, such weed condition may be referred to as indirect weed condition. For example, well developed plants may give an indication for well developed weed as well. One or more of such weed conditions may be taken into account for providing different control signals for operating the working tools applied for mechanical weeding.

Switching between different mechanical weeding, i.e. different control signals for operating the working tools, is conducted in dependence on direct and/or indirect weed condition(s).

For the method, the following may be provided: the working tools comprise working tools of a first type and working tools of a second type which is different from the first type; operating the working tools according to the first control data comprises applying the working tools of the first type for mechanical weeding, but not the working tools of the second type; and operating the working tools according to the second control data comprises applying the working tools of the second type for mechanical weeding. The different working tools may be configured to apply or conduct different kind or type of mechanical weeding. For example, the different types of working tools may be selected from the following: hoes, harrows, tines, brush weeder, and cutting tools. Depending on the weed condition indicated by the weed condition data one or more of the working tools may be selected for application according to the control signals.

In response to different control data indicating different weed conditions, the vertical position of the working tools relative to the soil surface may be adjusted in operation. At least one or all of the vertical working positions which can be applied to the working tools provide for penetration of the working tools into the soil. For different vertical position there may be different depth of penetration (working depth).

In another embodiment, for the method the following may be provided: operating the working tools according to the first control data for mechanical weeding comprises locating the working tools in a first vertical working position relative to the soil surface, and operating the working tools according to the second control data for mechanical weeding comprises locating the working tools in a second vertical working position relative to the soil surface, wherein the second vertical working position is different from the first vertical working position, and wherein the working tools are in soil contact in at least one of the first and second vertical working position. For example, the first vertical working position may provide for the working tools in contact with the soil (soil penetration), while in the second vertical working position the working tools are lifted compared with the first vertical working position and in no contact with the soil.

The locating of the working tools in the first and second vertical position may comprise moving the working tools by at least one of linear movement in a vertical direction and pivoting. For the working tools movement between different vertical working positions may be conducted by the linear movement, for example, along a vertical line of movement only or in part. As an alternative or in addition, the working tools may be movable by pivoting the working tools into different tilted positions. Movement of the working tools may be applied by relative movement between the working tools and a frame element of the agricultural machine provided for carrying the working tools. Alternatively or in addition, the frame element receiving the working tools may be moved for adjusting the vertical working position of the working tools.

In another embodiment, the method may comprise the following: the working tools, for conducting mechanically weeding, are in soil contact in both the first and second vertical position; the working tools are penetrating into the soil with a first working depth when located in the first vertical working position; and the working tools are penetrating into the soil with a second working depth which is different from the first working depth when located in the first vertical working position. More than two different working depths may be applied. By adjusting working depth (depth of penetration into the soil) for the working tools, for example, mechanical weeding may be adjusted to different species of weed. A bigger or higher working depth may be applied for weed larger than others. Similarly, in response to the weed condition data being indicative of low nutrient status of the crop plant the working depth may be increased for the working tools.

For the method the following may be provided: the working tools, for conducting mechanically weeding, are in soil contact in the first vertical position; and the working tools, for conducting mechanically weeding, are located above the soil surface contact when located in the second vertical working position. Mechanical weeding may be applied without the working tools being in contact with the soil (no penetration into the soil, working depth being zero). Still, such vertical position above the soil surface may be applied for mechanical weeding.

The providing of the first weed condition data may comprise providing first measurement data detected by a sensor device. One or more sensor devices may be provided. For example, a first sensor device may be assigned to one or more first working tools, and a second sensor device different from the first sensor device may be assigned to one or more second working tools being different from the first working tools. Measurement data may also be applied with respect to the second weed condition data. Different sensor signals may be indicative of a different weed conditions. The one or more sensor devices may be provided on the implement carrying the working tools, for example, the frame element carrying the working tools. As an alternative or in addition, one or more sensor devices may be provided on a tractor to which the implement having the working tools in hooked. In another embodiment, one or more sensor devices may be provided separately for the agricultural machine, for example, on a drone or a satellite device. Different types of sensor devices may be applied, for example, an optical sensor which is configured to detect color information about the weed. As an alternative or in addition, one or more cameras may be applied as sensor devices for collecting image data which can be processed by image data analysis for determining weed condition data.

A real time mode of operation may be applied for: detecting the first measurement data detected by the sensor device; providing the first weed condition data comprising the first measurement data detected in the control unit; providing first control signals in the control unit in response to receiving the first weed condition data; and operating the working tools according to the first control data for mechanical weeding. While the agricultural machine is travelling on the field measurement data are detected by one or more sensor devices. In response, operation of the working tools is adjusted in real time. As an alternative, measurement data may be collected or detected prior to the agricultural machine travelling on the field, for example, by a camera on a drone or a satellite device. Such measurement data can be stored in an electronic memory and processed for assignment to different control signals prior to operation of the agricultural machine on the field. Such data storing and processing, for example, may be conducted by a server device provided remotely from the agricultural machine. When the agricultural machine is travelling on the field, such precollected data and assignment can be applied in the control unit and/or the server device.

The providing of the first weed condition data may comprise providing first georeferenced weed condition data. For the georeferenced weed condition data some weed condition is assigned to some geographic location. Georeferenced weed condition data may be generated by combining the weed condition with location data provided, for example, by some location system such as the Global Positioning System (GPS).

At least one of receiving the first weed condition data and receiving the second weed condition data may comprise the weed condition data being indicative of at least one of from the following group: direct weed conditions comprising at least one of species of weed, variety of species of weed, size of weed, weed color, and stage of development of weed; and indirect weed conditions comprising at least one of soil aggregation, type of soil, plant vigor, plant size, plant color, plant development, nutrition status of plant, nutrition status of soil, and topography of soil surface. While direct weed conditions are indicative of some condition or parameter related to the weed itself, indirect weed conditions are referring to some non-weed parameter or condition which does have an impact on the weed (growing). If, for example, the weed condition data are indicative of the weed having a large size, the working depth for the working tools may be increased to some present working depth. In case of the weed having smaller sign the working depth may be decreased, or there may be some increase smaller compared to the situation with the weed having large size. The working depth for the working tools may be increased if the weed condition data are indicative of some low nutrient status of the crop plant.

The method may comprise providing transport control signals in the control unit, and applying the transport control signals, thereby, moving the working tools in a transport position. Transport position for the working tools may be applied for transporting the agricultural machine on a street. For example, the transport position may be a fully lifted or retracted position of the working tools. The transport position is different from the plurality of vertical working positions which may be applied for the working tools.

The method may further comprise providing interrupting control signals in the control unit, and applying the interrupting control signals, thereby, moving the working tools in a non-working position which is different the first vertical working position, the second vertical working position, and the transport position. The non-working position, for example, may be applied while the agricultural machine is traveling in a headland area, thereby, not applying the working tools for mechanical weeding. The working tools may be in a lifted-up position when moved to the non-working position compared to the different vertical working positions which comprise one or more vertical positions for which the working tools are not in contact with the soil (penetration into the soil).

The method may further comprise controlling operation of the working tools individually. The working tools may be controlled separately from each other. For example, there may a number n (n>2) of different or individual control signals, each of the control signals assigned or applied to control operation of (only) one of the working tools, For example, the vertical positon of the working tools may be controlled individually by the control signals.

The different embodiments described for the method for operating the agricultural machine above may be applied to the agricultural machine mutatis mutandis.

DESCRIPTION OF FURTHER EMBODIMENTS

Figure 2:
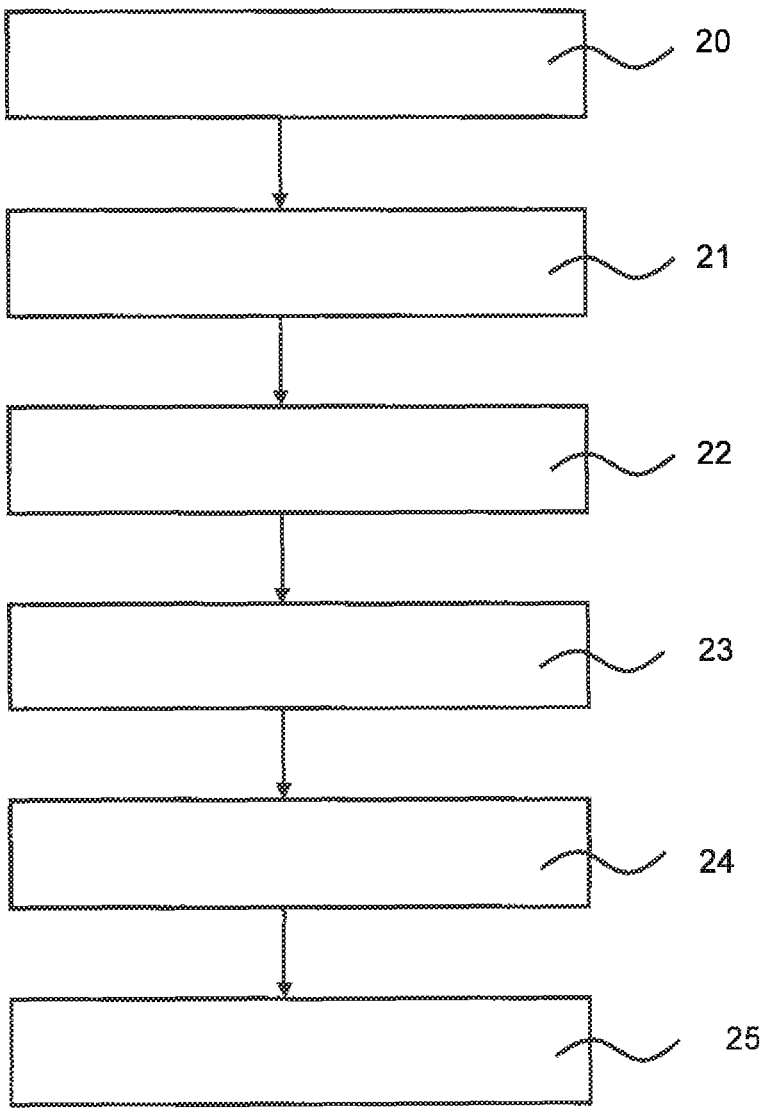

Following, further embodiments are described. Reference is made to figures. In the figures show:

FIG. 1 a schematic representation of an agricultural machine having a plurality of working tools configured for mechanical weeding; and FIG. 2 a schematic block diagram for a method for operating the agricultural machine.

FIG. 1 shows a schematic representation of an agricultural machine 1 having a plurality of working tools 2, and a control unit 3 functionally connected to the plurality of working tools 2. The agricultural machine 1 may be provided by an implement to be hooked to the tractor. Alternatively, the agricultural machine 1 may be a self propelling agricultural machine.

The plurality of working tools 2 is configured to apply mechanical weeding while the agricultural machine 1 is travelling on a field. The plurality of working tools 2 may comprise only a single type of working tools or, as an alternative, a plurality of different types of working tools for mechanical weeding. The plurality of working tools 2 may be received on a frame element (not shown) which is carrying the plurality of working tools 2. One or more actuators (not shown) are assigned to the frame element and/or the plurality of working tools 2 for adjusting location of the plurality of working tools 2 relative to the soil surface while the agricultural machine 1 is travelling on the field. There may be one actuator assigned to a single working tool or a common actuator assigned to at least two working tools. Adjustment of the position of the plurality of working tools 2 provides for applying mechanical weeding with different operation or control parameters.

The control unit 3 which may be provided on the implement or the tractor to which the implement is hooked is configured to control operation of the plurality of working tools 2 for mechanical weeding in dependence on weed condition data provided in the control unit 3. For example, the weed condition data may comprise measurement data detected by a sensor device 4 which is configured to measure one or more weed conditions or parameters for the weed itself (direct weed condition) or some other parameter having impact on the development or growing of the weed, thereby, being indicative of some indirect weed condition. For example, the sensor device 4 may be provided with one or more cameras detecting image data while the agricultural machine 1 is travelling on the field. The sensor device 4 may be provided on the agricultural machine itself. As an alternative, the sensor device 4 may be provided on the tractor to which the implement is hooked. Also, it may be foreseen to have the sensor device 4 provided separately from the agricultural machine 1, for example on a drone or a satellite device.

Different types of sensor devices may be applied, for example, an optical sensor which is configured to detect color information about the weed. As an alternative or in addition, one or more cameras may be applied as sensor device for collecting image data which can be processed by image data analysis for determining weed condition data.

Referring to FIG. 2, a method for operating the agricultural machine 1 travelling on the field is described. In step 20, first weed condition data are provided in the control unit 3, the first weed condition data being indicative of a first weed condition of the weed to be mechanically weeded by the plurality of working tools 2. First control signals are provided in step 21 in the control unit 3 in response to receiving the first weed control data, the first control signals being assigned to the first weed condition according to operation control data stored in a memory device 5 accessible by data communication or integrated in the control unit

7

3. In step 22 the plurality of working tools 2 is operated according to the first control signals for mechanical weeding.

Following, in step 23 second weed condition data are provided in the control unit 3, the second weed condition data being indicative of a second weed condition of the weed to be mechanically weeded. The second weed condition is different from the first weed condition. For example, the size of the weed may be detected different according to the first and the second weed condition. In step 24, second control signals are provided in the control unit in response to the second weed condition. The second control signals are assigned to the second weed condition according to the operation control data. Following, the plurality of working tools 2 is operated according to the second control signal for mechanical weeding (step 25).

In response to the different weed condition data, different types of working tools may be applied. In another example, the working position of one or more working tools relative to the soil surface may be adjusted in response to the different wood conditions indicated by the weed condition data.

The features or limitations dieclosed in this specification, the figures and/or the claims may be material for the realization of various embodiments, taken in isolation or in various combinations thereof.

The invention claimed is:

1. A method for operating an agricultural machine having working tools configured for mechanical weeding of weed, comprising, while the agricultural machine is travelling on a field:
   receiving first weed condition data indicative of a first weed condition of the weed to be mechanically weeded by the working tools in a control unit of the agricultural machine;
   providing first control signals in the control unit in response to receiving the first weed condition data, the first control signals assigned to the first weed condition according to operation control data stored in a memory device;
   operating the working tools according to the first control signals for mechanical weeding;
   receiving second weed condition data indicative of a second weed condition of the weed to be mechanically weeded, wherein the second weed condition is different from the first weed condition;
   providing second control signals in the control unit in response to receiving the second weed condition data, the second control signals assigned to the second weed condition according to the operation control data;
   operating the working tools according to the second control signals for mechanical weeding;
   providing transport control signals in the control unit; and
   applying the transport control signals, thereby, moving the working tools to a transport position.

2. The method of claim 1, wherein:
   the working tools comprise working tools of a first type and working tools of a second type which is different from the first type;
   operating the working tools according to the first control data comprises applying the working tools of the first type for mechanical weeding, but not the working tools of the second type; and
   operating the working tools according to the second control data comprises applying the working tools of the second type for mechanical weeding.

3. The method of claim 1, wherein:
   operating the working tools according to the first control data for mechanical weeding comprises locating the working tools in a first vertical working position relative to the soil surface; and
   operating the working tools according to the second control data for mechanical weeding comprises locating the working tools in a second vertical working position relative to the soil surface, wherein the second vertical working position is different from the first vertical working position;
   wherein the working tools are in soil contact in at least one of the first and second vertical working positions.

4. The method of claim 3, wherein locating the working tools in the first and second vertical positions comprises moving the working tools by at least one of linear movement in a vertical direction and pivoting.

5. The method of claim 3, wherein:
   the working tools, for conducting mechanically weeding, are in soil contact in both the first and second vertical position;
   the working tools penetrate into the soil with a first working depth when located in the first vertical working position; and
   the working tools penetrate into the soil with a second working depth which is different from the first working depth when located in the first vertical working position.

6. The method of claim 3, wherein:
   the working tools, for conducting mechanically weeding, are in soil contact in the first vertical position; and
   the working tools, for conducting mechanically weeding, are located above the soil surface contact when located in the second vertical working position.

7. The method of claim 3, further comprising:
   providing interrupting control signals in the control unit; and
   applying the interrupting control signals, thereby, moving the working tools to a non- working position which is different the first vertical working position, the second vertical working position, and a transport position.

8. The method of claim 1, wherein providing the first weed condition data comprises providing first measurement data detected by a sensor device.

9. The method of claim 8, comprising applying a real time mode of operation for:
   detecting the first measurement data detected by the sensor device;
   providing the first weed condition data comprising the first measurement data detected in the control unit;
   providing first control signals in the control unit in response to receiving the first weed condition data; and
   operating the working tools according to the first control data for mechanical weeding.

10. The method of claim 1, wherein providing the first weed condition data comprises providing first georeferenced weed condition data.

11. The method of claim 1, wherein at least one of receiving the first weed condition data and receiving the second weed condition data comprises the weed condition data being indicative of at least one condition selected from the group consisting of:
   direct weed conditions comprising at least one of species of weed, variety of species of weed, size of weed, weed color, and stage of development of weed; and
   indirect weed conditions comprising at least one of soil aggregation, type of soil, plant vigor, plant size, plant color, plant development, nutrition status of plant, nutrition status of soil, and topography of soil surface.

12. The method of claim 1, further comprising controlling operation of the working tools individually.

13. An agricultural machine, comprising:

working tools configured for mechanical weeding while the agricultural machine is travelling on a field; and a control unit configured to:

receive first weed condition data indicative of a first weed condition of weed to be mechanically weeded by the working tools in the a control unit of the agricultural machine;

provide first control signals in the control unit in response to receiving the first weed condition data, the first control signals assigned to the first weed condition according to operation control data stored in a memory device;

apply the first control signals for operating the working tools according to the first control signals for mechanical weeding;

receive second weed condition data indicative of a second weed condition of the weed to be mechanically weeded, wherein the second weed condition is different from the first weed condition;

provide second control signals in the control unit in response to receiving the second weed condition data, the second control signals assigned to the second weed condition according to the operation control data;

apply the second control signals for operating the working tools according to the second control signals for mechanical weeding;

provide transport control signals in the control unit; and apply the transport control signals, thereby, moving the working tools to a transport position.

* * * * *